US012678799B2

(12) United States Patent
Agustoni et al.

(10) Patent No.: US 12,678,799 B2
(45) Date of Patent: Jul. 14, 2026

(54) POLISHING TANK WITH REMOVABLE SOCK AND INTEGRATED SENSORS

(71) Applicant: The Swatch Group Research and Development Ltd, Marin (CH)

(72) Inventors: Enzo Agustoni, Cudrefin (CH); Yoann Mosteiro Vazquez, Montmagny (CH); François Erdemli, Colombier (CH)

(73) Assignee: The Swatch Group Research and Development Ltd, Marin (CH)

( * ) Notice: Subject to any disclaimer, the term of this patent is extended or adjusted under 35 U.S.C. 154(b) by 363 days.

(21) Appl. No.: 17/768,376

(22) PCT Filed: Nov. 5, 2020

(86) PCT No.: PCT/EP2020/081177

§ 371 (c)(1),
(2) Date: Apr. 12, 2022

(87) PCT Pub. No.: WO2021/089724

PCT Pub. Date: May 14, 2021

(65) Prior Publication Data

US 2024/0149272 A1 May 9, 2024

(30) Foreign Application Priority Data

Nov. 8, 2019 (EP) .................................... 19208060

(51) Int. Cl.
*B02C 17/18* (2006.01)
*B02C 17/04* (2006.01)

(52) U.S. Cl.
CPC ............ *B02C 17/182* (2013.01); *B02C 17/04* (2013.01); *B02C 17/1805* (2013.01)

(58) Field of Classification Search
CPC .................................................. B65D 79/0087
See application file for complete search history.

(56) References Cited

U.S. PATENT DOCUMENTS

| | | | | | |
|---|---|---|---|---|---|
| 1,934,461 | A | * | 11/1933 | Hartley | B24B 31/02 451/328 |
| 1,947,667 | A | * | 2/1934 | Von Till | B65D 47/42 15/231 |
| 3,836,033 | A | * | 9/1974 | Podesta | B65D 51/145 215/276 |
| 4,852,753 | A | * | 8/1989 | Ochs | B65D 51/145 215/271 |

(Continued)

FOREIGN PATENT DOCUMENTS

| | | |
|---|---|---|
| CN | 205274155 U | 6/2016 |
| CN | 208913835 U | 5/2019 |

(Continued)

OTHER PUBLICATIONS

Chinese Office Action dated Mar. 1, 2024 in Application No. 202080073304.4.

(Continued)

*Primary Examiner* — Brian D Keller
*Assistant Examiner* — Jason Khalil Hawkins
(74) *Attorney, Agent, or Firm* — Sughrue Mion, PLLC

(57) ABSTRACT

The present invention relates to a polishing tank (100) with a metal sleeve (110) and a removable insert modular system (120) configured to be inserted into said sleeve and to be removed from said sleeve.

9 Claims, 1 Drawing Sheet

(56) References Cited

U.S. PATENT DOCUMENTS

| | | | | | |
|---|---|---|---|---|---|
| 5,046,287 | A * | 9/1991 | Lin | B24B 31/16 451/328 |
| 7,141,224 | B2 * | 11/2006 | Costa | C02F 1/685 220/255 |
| 7,252,576 | B1 | 8/2007 | Komanduri et al. | |
| 7,959,022 | B2 * | 6/2011 | Kerman | B65D 41/0471 215/43 |
| 10,759,588 | B1 * | 9/2020 | Lobisser | B65D 19/02 |
| 2002/0013125 | A1 * | 1/2002 | Fujishiro | B24B 31/12 451/326 |
| 2006/0116053 | A1 * | 6/2006 | Nishimura | B24B 31/108 451/326 |

FOREIGN PATENT DOCUMENTS

| | | | |
|---|---|---|---|
| CN | 209036248 | U | 6/2019 |
| JP | 63-52965 | A | 3/1988 |
| JP | 63-150152 | A | 6/1988 |
| JP | 2003-25212 | A | 1/2003 |
| JP | 2003-025212 | A | 1/2003 |
| JP | 2005-193370 | A | 7/2005 |
| JP | 2007-331083 | A | 12/2007 |
| JP | 2018-47524 | A | 3/2018 |
| KR | 10-2019-0112554 | A | 10/2019 |
| WO | 95/020465 | A1 | 8/1995 |
| WO | 99/033610 | A1 | 7/1999 |

OTHER PUBLICATIONS

Chinese Office Action dated Dec. 5, 2023 in Application No. 202080073304.4.

International Search Report for PCT/EP2020/081177 dated Jan. 26, 2021 [PCT/ISA/210].

Written Opinion for PCT/EP2020/081177 dated Jan. 26, 2021 [PCT/ISA/237].

* cited by examiner

POLISHING TANK WITH REMOVABLE SOCK AND INTEGRATED SENSORS

CROSS REFERENCE TO RELATED APPLICATIONS

This application is a National Stage of Application No. PCT/EP2020/081177 filed Nov. 5, 2020, which designates the United States, incorporated herein by reference, and which claims the benefit of priority from European Patent Application No. 19208060.4 filed Nov. 8, 2019, the entire contents of which are incorporated herein by reference.

TECHNICAL FIELD

The present invention relates to the field of polishing tanks.

TECHNOLOGICAL BACKGROUND

Polishing tanks are a key part of the bulk polishing method, they must satisfy several constraints, and must be mechanically robust, manageable, light.

However, the interior lining wears out and therefore it is necessary to redo it or even replace it on the one hand, and on the other hand, it is not easy to follow the process inside the polishing tank.

SUMMARY OF THE INVENTION

The present invention proposes to solve all or part of these disadvantages by means of a polishing tank comprising:

A metal sleeve; and,

A removable insert modular system; said removable insert modular system being configured to be inserted into said sleeve and to be removed from said sleeve.

Thanks to this arrangement, it is possible to change the interior lining very easily.

According to one embodiment, the metal sleeve is made of aluminium, copper, silicon, magnesium, titanium, nickel, zinc or an alloy of these materials.

Thanks to this arrangement, the polishing tank is light, easy to handle and to reline.

According to one embodiment, said removable insert modular system is made of synthetic material.

Thanks to this arrangement, the insertion of said removable insert modular system in said removable sleeve is facilitated.

According to one embodiment, said polishing tank comprises a set of sensors and preferably at least one pressure sensor and/or at least one temperature sensor.

According to one embodiment, said metal sleeve comprises a deformable area so as to locate a deformation.

Thanks to this arrangement, the deformation due to the pressure is located and allows to guarantee reference or bearing areas, etc.

According to one embodiment, said metal sleeve comprises a cover held to the body of the sleeve by fastening members and preferably screws.

Thanks to this arrangement, the safety of the operator during the unscrewing phase is increased.

The embodiments and variants mentioned above can be taken individually or according to any technically possible combination.

The present invention will be well understood and its advantages will also emerge in light of the following description, given only by way of non-limiting example and made with reference to the appended figures, wherein identical reference signs correspond to elements which are structurally and/or functionally identical or similar.

BRIEF DESCRIPTION OF THE FIGURES

The invention will be described below in more detail using the appended drawings, given by way of non-limiting examples, wherein.

DETAILED DESCRIPTION OF THE INVENTION

Figure 1:
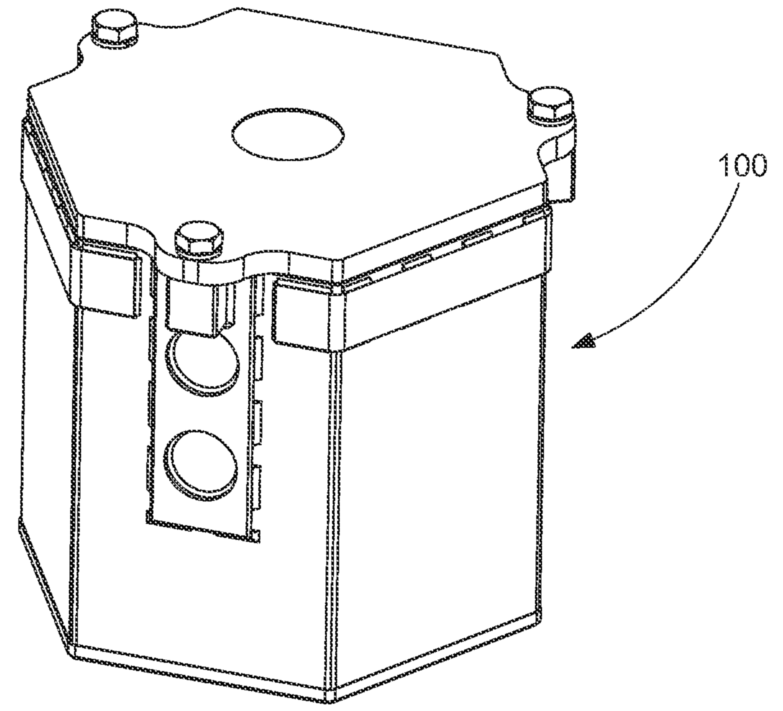
FIG. 1 shows a polishing tank 100 according to one embodiment.

The present invention relates to a polishing tank 100, shown in FIG. 1, comprising a metal sleeve 110, which can be made of a light metal such as, for example, aluminium, copper, silicon, magnesium, titanium, nickel, zinc or of a light alloy comprising at least two of these materials, and a removable insert modular system 120 configured to be inserted into said sleeve and to be removed from said sleeve so as to be able to change the interior lining very easily.

The polishing tank 100 thus combines a limited weight with good mechanical strength.

Said removable insert modular system 120, described above, can be made of synthetic material so as to be able to change its sleeve more easily. Indeed, the polishing tank 100 thus has a modular system of synthetic material inserts, easily made and easily replaced.

Figure 2:
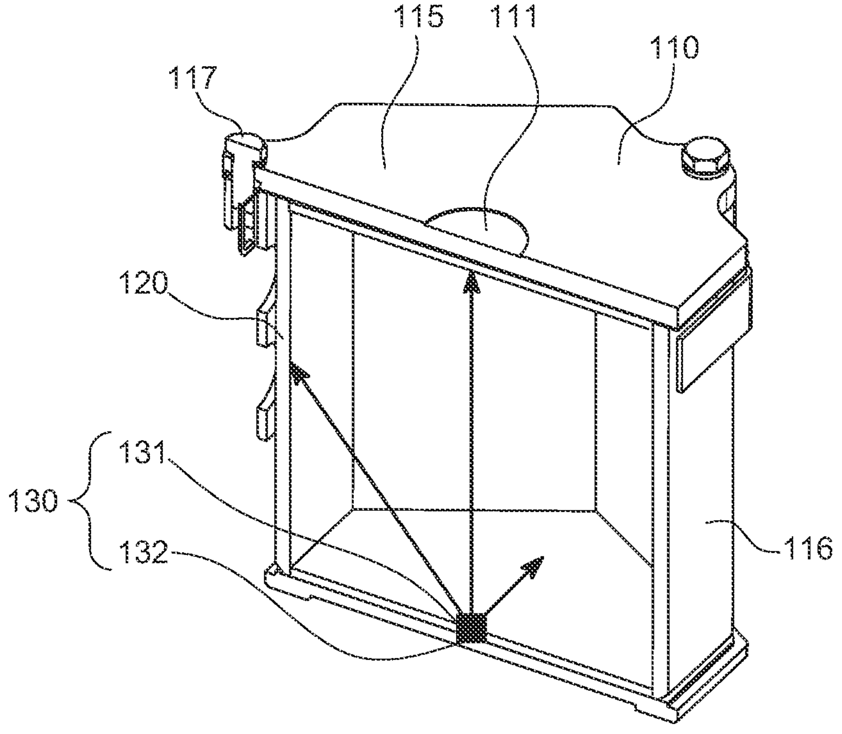
FIG. 2 shows a sectional view of the metal sleeve 110 and the removable insert modular system 120 according to one embodiment.

Moreover, as illustrated in FIG. 2, said polishing tank 100 may comprise a set of sensors 130 and preferably at least one pressure sensor 131 to measure the pressure inside said metal sleeve 110 and/or at least one temperature sensor 132 to measure the temperature inside said metal sleeve 110. Indeed, it may be interesting for the operator to know the pressure, because the latter may be quite high and induce a deformation. It is for this purpose that said metal sleeve 110 comprises a deformable area 111 so as to locate this deformation. Other types of sensors can also be embedded, depending on the information relevant for the polishing method planned in the tank.

In addition, in order to preserve the safety of the operator during the opening phase, fastening members 117 and preferably screws keep the cover 115 held to the body 116 of the sleeve 110.

The invention claimed is:

1. A polishing tank (100) comprising:

a metal sleeve (110); and, a removable insert modular system (120); said removable insert modular system (120) being configured to be inserted into said metal sleeve (110) and to be removed from said metal sleeve (110), wherein said metal sleeve (110) comprises a deformable area (111) integral to the metal sleeve (110) and configured to deform outwardly so as to identify a deformation of the deformable area due to an increased pressure within the sleeve above atmospheric pressure wherein the deformable area deforms to a greater extent than other areas of the metal sleeve so as to provide a visual indication of the increased pressure, wherein said metal sleeve (110) comprises a cover (115) held to the body (116) of the sleeve (110) by fastening members (117), the fastening members (117) are screws, the cover (115) comprises a hexagonal perimeter, and the screws are provided at three sides of the hexagonal perimeter of the cover (115).

2. The polishing tank (100) according to claim 1, wherein the metal sleeve (110) is made of aluminium, copper, silicon, magnesium, titanium, nickel, zinc or an alloy of these materials.

3. The polishing tank (100) according to claim 1, wherein said removable insert modular system (120) is made of synthetic material.

4. The polishing tank (100) according to claim 1, which comprises a set of sensors (130), including a pressure sensor (131) and a temperature sensor (132).

5. The polishing tank (100) according claim 1, wherein the deformable area is in the cover.

6. The polishing tank (100) according to claim 5, wherein the deformable area is circular in plan view.

7. The polishing tank (100) according to claim 6, wherein the metal sleeve (110) is polygonal in plan view.

8. The polishing tank (100) according to claim 6, wherein the removable insert modular system (120) is polygonal in plan view.

9. The polishing tank (100) according to claim 1, wherein, along a direction in which the removable modular system (120) is configured to be inserted into said metal sleeve (110), the deformable area (111) is thinner than portions of the metal sleeve (110) other than the deformable area (111).

* * * * *